United States Patent Office 3,382,232
Patented May 7, 1968

3,382,232
METHOD FOR THE PRODUCTION OF
5'-RIBONUCLEOTIDE
Mikio Honjo and Kin-ichi Imai, Takatsuki, Japan, assignors to Takeda Chemical Industries, Ltd., Osaka, Japan
No Drawing. Filed Aug. 24, 1966, Ser. No. 574,530
Claims priority, application Japan, Aug. 26, 1965, 40/52,274; Aug. 27, 1965, 40/52,427
17 Claims. (Cl. 260—211.5)

ABSTRACT OF THE DISCLOSURE

Only the hydroxy group at the 5'-position of a ribonucleoside, which is to be converted into the corresponding nucleotide, is selectively phosphorylated—and that without having to protect the 2'- and 3'-OH groups prior to the phosphorylation—by reacting the ribonucleoside with a phosphorylating agent in the presence of an ester of an organic carboxylic acid having 2 to 7 carbon atoms and/or of a nitrohydrocarbon having 1 to 7 carbon atoms, followed by subjecting the resultant product to hydrolysis.

This invention is concerned with a method for the production of 5'-ribonucleotide, which comprises reacting the corresponding ribonucleoside with a specific phosphorylating agent in the presence of organic acid ester or esters or nitro compound or compounds, followed by subjecting the resultant product to hydrolysis.

Recently considerable attention has been directed to synthesis of 5'-ribonucleotides, because these compounds have direct bearing on the biologically important ribonucleic acid and nucleotide co-enzymes.

In addition, disodium salts of nucleoside-5'-monophosphate have been used as condiments in the production of various foods, by virtue of their characteristic flavor enhancing or seasoning qualities.

Ribonucleoside has three hydroxy groups at the 2'-, 3'- and 5'-positions respectively on its ribose moiety, and when ribonucleoside is directly subjected to phosphorylation, a mixture of ribonucleoside-2',5'-diphosphate and -3',5'-diphosphate is produced.

Therefore, in order to selectively produce 5'-ribonucleotide from the corresponding ribonucleoside, it has been necessary to protect the hydroxy groups at 2'- and 3'-position with certain suitable substituents prior to effecting phosphorylation at the 5'-position.

Thus, the hitherto-known methods for the production of 5'-ribonucleotide starting with the corresponding ribonucleoside consist of protecting the 2'- and 3'-hydroxy groups on the ribose moiety with acyl groups (e.g. acetyl, benzoyl radicals, etc.) or the isopropylidene group, subsequently phosphorylating the free 5'-hydroxy group by an appropriate agent, and then removing the protecting groups.

However, the hitherto-known methods are not advantageously applicable to the preparation of 5'-ribonucleotide from the corresponding ribonucleoside on a commercial scale because they require many troublesome steps, especially the step of protecting the 2'- and 3'-hydroxy groups and that of removing the protecting groups; moreover, the yield of the product is low.

It is an object of the present invention to provide a novel and industrially feasible method for the production of 5'-ribonucleotide from the corresponding ribonucleoside.

It is also an object of the invention to prepare 5'-ribonucleotide from the corresponding ribonucleoside in a good yield by simple procedure and without the necessity of protecting the hydroxy groups at the 2'- and 3'-positions.

These objects are realized by the present invention on the basis of the unexpected finding that only the hydroxy group at the 5'-position of the ribonucleoside is selectively phosphorylated without requiring protecting of the hydroxyl groups at the 2'- and 3'-poistions prior to the phosphorylation, by reacting the ribonucleoside with a phosphorylating agent in the presence of certain organic acid ester(s) or nitro compound(s), followed by subjecting the resultant product to hydrolysis.

The present method for the production of 5'-ribonucleotide is superior from an industrial point of view, since it does not involve such troublesome procedure as protection of 2'- and 3'-hydroxy groups and removal of the protecting groups, and easily affords the desired 5'-ribonucleotide in a good yield.

As stated above, the present invention comprises reacting ribonucleoside with a phosphorylating agent in the presence of certain organic acid ester(s) or nitro compound(s).

The ribonucleosides in the present invention are exemplified by those containing a purine base (e.g. adenine, hypoxanthine, guanine, etc.), those containing a pyrimidine base (e.g. cytosine, uracil, thymine, etc.) and those containing a pyridine base (e.g. nicotinamide, etc.), regardless of whether such ribonucleosides are naturally occurring or synthetic.

The organic acid esters used in the present invention are esters of organic carboxylic acids having 2 to 7 carbon atoms such as aliphatic organic acids (e.g. acetic acid, propionic acid, acrylic acid, oxalic acid, etc.), aromatic organic acids (e.g. benzoic acid, etc.).

As the esters, lower aliphatic esters (e.g. methyl-, ethyl-, propyl-, butyl-ester, etc.) of these organic carboxylic acids are advantageous, but if desired higher aliphatic esters (e.g. lauryl ester, palmityl ester, etc.) or aromatic esters (e.g. phenyl ester, etc.) may be used.

The nitro compounds used in the present invention are nitrohydrocarbons having 1 to 7 carbon atoms and are exemplified by aliphatic mononitro compounds such as nitromethane, nitroethane, etc., aliphatic polynitro compounds such as tetranitromethane, 1,3-dinitropropane, etc., and aromatic nitro compounds such as nitrobenzene, di-nitrobenzene, m-nitrotoluene, etc.

These organic acid esters and nitro compounds can be successfully employed singly or in various combination.

Among the esters of organic carboxylic acids, ethyl acetate, methyl acrylate and ethyl benzoate, more especially, give best results.

Among the nitro compounds, aliphatic or aromatic mononitro compounds are advantageous, and nitromethane and nitrobenzene give best results.

The phosphorylating agents in the present method comprise, for example, phosphorus trichloride, phosphorus oxychloride, phosphorus pentachloride, pyrophosphoryl tetrachloride, partially hydrolyzed phosphorus oxychloride, partially hydrolyzed phosphorus pentachloride or partially hydrolyzed phosphorus trichloride which are prepared by mixing water and corresponding phosphorus compounds, or partially alcoholyzed phosphorus oxychloride, partially alcoholyzed phosphorus pentachloride or partially alcoholyzed phosphorus trichloride which are prepared by mixing a lower alcohol having 1 to 4 carbon atoms (e.g. methyl alcohol, ethyl alcohol, propyl alcohol, isopropyl alcohol, butyl alcohol, tertiary butyl alcohol) with the corresponding phopshorus compound.

Among these phosphorylating agents, pyrophosphoryl tetrachloride and phosphorus oxychloride give best results. These agents can be successfully employed singly or in combination.

The present method is carried out by adding the phosphorylating agents to the ribonucleoside, dissolved or suspended in the organic acid esters or nitro compounds, to allow phosphorylation to take place, and then hydrolyzing the resultant product.

The above-mentioned ribonucleoside, organic acid esters, nitro compounds and phosphorylating agents need not be in a pure state.

Amount of organic acid esters, nitro compounds and phosphorylating agents used vary with the kind of ribonucleoside, organic acid esters, nitro compounds or phosphorylating agents.

Generally, the amount of the phosphorylating agent is from about 1 to about 30 moles, optimally about 2 to about 10 moles in case of using organic acid esters, about 2 to about 15 moles in case of using nitro compounds, relative to the ribonucleoside.

The organic acid esters or nitro compounds are employed in an amount of not less than 40 moles per mole of the ribonucleoside, and generally are employed in an amount ranging from about 40 to about 600, optimally from about 50 to about 100 moles, per mole of the ribonucleoside.

The reaction proceeds easily at not higher than room temperature (about 15° to about 30° C.) for about 1 to 4 hours, but if desired can be carried out with heating or cooling.

In case of using liquid organic acid esters or nitro compounds, no solvent is required, since these compounds act as solvents.

On the other hand, in case of using a solid compound, a suitable solvent such as benzene, xylene and toluene is used together with the compound.

In this way, only the 5'-OH group of the ribonucleoside is selectively phosphorylated. Thus-obtained product is then subjected to hydrolysis to give 5'-ribonucleotide.

The hydrolysis is carried out by per se known procedure, for example, by pouring the reaction mixture into water, preferably cooled water, or by adjusting the pH value of the reaction mixture obtained in the first step to the weakly acid area, desirably to about 1 to about 2, by adding an alkaline material (e.g. sodium hydroxide, potassium hydroxide, sodium carbonate, potassium carbonate, etc.). Thus, the desired 5'-ribonucleotide is produced.

As detailed above, by the present invention 5'-ribonucleotide can be easily obtained by a simple process and under moderate conditions as compared with so far known methods.

For the purpose of giving those skilled in the art a better understanding of the invention, the following examples of presently preferred embodiments are given. Parts by weight bear the same relation to parts by volume as do grams to milliliters. The term "normal" means "1 normal."

Example 1

To 1.35 parts by weight of inosine suspended in 150 parts by volume of ethyl acetate was added 5 parts by volume of pyrophosphoryl tetrachloride at 0 to 5° C. The mixture was stirred at the same temperature for 2 hours. The reaction mixture was poured into 250 parts by volume of ice water, and the aqueous layer was separated from the ethyl acetate layer, followed by being adjusted to pH 2 with normal aqueous solution of sodium hydroxide. Analysis of so-adjusted solution by means of paper-electrophoresis (borate buffer, pH 9.2) showed that inosine-5'-monophosphate was produced in a yield of 85%.

The solution was then adsorbed on a column of 20 parts by weight of active charcoal. The column was washed with water and eluted with an 0.7% aqueous solution of sodium hydroxide.

The elutate was adjusted to pH 8.6 and concentrated to give 1.57 parts by weight of crystals of disodium salt of inosine-5'-monophosphate (calculated as anhydride). Yield 80%.

Example 2

To 1.2 parts by weight of adenosine suspended in 150 parts by volume of ethyl acetate was added 5 parts by volume of pyrophosphoryl tetrachloride at 0 to 5° C. The mixture was stirred at the same temperature for one hour. The reaction mixture was treated as in Example 1 to give 1.68 parts by weight of crystals of disodium salt of adenosine-5'-monophosphate (calculated as anhydride). Yield 86%.

Example 3

To 1.2 parts by weight of uridine suspended in 300 parts by volume of ethyl acetate was added 10 parts by volume of pyrophosphoryl tetrachloride at 0 to 5° C. After the mixture was stirred at the same temperature for 2 hours to allow a reaction to take place, it was treated in the same way as in Example 1.

Analysis of the product by means of paper-electrophoresis (borate buffer, pH 9.2) showed that uridine-5'-monophosphate was produced in a yield 70%.

Example 4

To 1.35 parts by weight of inosine suspended in 150 parts by volume of ethyl benzoate was added 5 parts by volume of pyrophosphoryl tetrachloride at 0 to 5° C.

After the mixture was stirred at the same temperature for one hour to allow a reaction to take place, it was treated in the same way as in Example 1.

Analysis of the product by means of paper-electrophoresis (borate buffer, pH 9.2) showed that inosine-5'-monophosphate was produced in a yield of 83%.

Example 5

To 1.35 parts by weight of adenosine suspended in 150 parts by volume of methyl acrylate was added 5 parts by volume of pyrophosphoryl tetrachloride at 0 to 5° C. After the mixture was stirred at the same temperature for one hour to allow a reaction to take place, it was treated in the same way as in Example 1.

Analysis of the product by means of paper-electrophoresis (borate buffer, pH 9.2) showed that adenosine-5'-monophosphate was produced in a yield of 95%.

Example 6

To 1.35 parts by weight of inosine suspended in 100 parts by volume of ethyl acetate was added 50 parts by volume of phosphorus oxychloride at 0 to 5° C. After the mixture was stirred under 45 to 50° C. for 2 hours to allow a reaction to take place, it was treated in the same way as in Example 1.

Analysis of the product by means of paper-electrophoresis (borate buffer, pH 9.2) showed that inosine-5'-monophosphate was selectively produced.

Example 7

To 1.42 parts by weight of guanosine suspended in 150 parts by volume of ethyl acetate was added 5 parts by volume of pyrophosphoryl tetrachloride at 0 to 5° C.

After the mixture was stirred at the same temperature for 4 hours to allow a reaction to take place, it was subsequently treated in the same way as in Example 1.

Analysis of the product by means of paper-electrophoresis (borate buffer, pH 9.2) showed that quanosine-5'-monophosphate was selectively produced.

Example 8

To 1.2 parts by weight of cytidine suspended in 150 parts by volume of ethyl acetate was added 5 parts by volume of pyrophosphoryl tetrachloride at 0 to 5° C.

The mixture was stirred at the same temperature for 2 hours. The reaction mixture was treated in the same way as in Example 1 to give 1.38 parts by weight of crystals of disodium salt of cytidine-5'-monophosphate (calculated as anhydride). Yield 75%.

Example 9

To 1.35 parts by weight of inosine suspended in 150 parts by volume of nitrobenzene was added 5 parts by volume of pyrophosphoryl tetrachloride at 0 to 5° C. The mixture was stirred at the same temperature for 2 hours. The reaction mixture was poured into 250 parts by volume of ice water and the whole mixture was shaken with 250 parts by volume of ethyl ether to transfer the nitrobenzene into the ether layer.

The ether layer was washed with water. The aqueous layer combined with the washing was adjusted to pH 2 with normal aqueous solution of sodium hydroxide.

An analysis of so-adjusted aqueous solution by means of paper-electrophoresis (borate buffer, pH 9.2) showed that inosine-5'-monophosphate was produced in a yield of 82%.

The solution was adsorbed on a column packed with 20 parts by weight of active charcoal. The column was washed with water and eluted with an 0.7% aqueous solution of sodium hydroxide.

The eluate was adjusted to pH 8.6, and concentrated to give 1.49 parts by weight of crystals of disodium salt of inosine - 5'-monophosphate (calculated as anhydride). Yield 76%.

Example 10

To 1.35 parts by weight of adenosine suspended in 150 parts by volume of nitrobenzene was added 5 parts by volume of pyrophosphoryl tetrachloride at 5 to 10° C. The mixture was stirred at the same temperature for 2 hours. The reaction mixture was treated in the same way as in Example 7 to give 1.57 parts by weight of crystals of disodium salt of adenosine-5'-monophosphate (calculated as anhydride). Yield 80%.

Example 11

To 1.2 parts by weight of uridine suspended in 300 parts by volume of nitromethane was added 10 parts by volume of pyrophosphoryl tetrachloride at 0 to 5° C. After the mixture was stirred at the same temperature for 2 hours to allow a reaction to take place, it was treated in the same way as in Example 7.

Analysis of the product by means of paper-electrophoresis (borate buffer, pH 9.2) showed that uridine-5'-monophosphate was produced in a yield of 55%.

Example 12

To 1.35 parts by weight of inosine suspended in 100 parts by volume of nitrobenzene was added 5 parts by volume of phosphorus oxychloride at 0 to 5° C. After the mixture was stirred at the same temperature for 2 hours to allow a reaction to take place, it was treated in the same way as in Example 7.

Analysis of the product by means of paper-electrophoresis (borate buffer, pH 9.2) showed that inosine-5'-monophosphate was selectively produced.

What is claimed is:

1. A method for producing 5'-ribonucleotide from the corresponding ribonucleoside, which comprises reacting the ribonucleoside with phosphorylating agent in the presence of a member selected from the group consisting of esters of organic carboxylic acid having 2 to 7 carbon atoms and nitrohydrocarbons having 1 to 7 carbon atoms, the molar proportion of organic acid ester and of nitro compound respectively to ribonucleoside being about 40 to about 600.

2. The method as claimed in claim 1, wherein the ribonucleoside is reacted with phosphorylating agent in the presence of ester of organic carboxylic acid having 2 to 7 carbon atoms.

3. The method as claimed in claim 1, wherein the ribonucleoside is reacted with phosphorylating agent in the presence of nitrohydrocarbon having 1 to 7 carbon atoms.

4. The method as claimed in claim 1, wherein the molar proportion of organic acid ester and of nitro compound respectively to ribonucleoside is about 50 to about 100.

5. The method as claimed in claim 1, wherein the ribonucleoside is inosine.

6. The method as claimed in claim 1, wherein the ribonucleoside is guanosine.

7. The method as claimed in claim 1, wherein the ribonucleoside is adenosine.

8. The method as claimed in claim 1, wherein the ribonucleoside is cytidine.

9. The method as claimed in claim 1, wherein the ribonucleoside is uridine.

10. The method as claimed in claim 2, wherein the organic acid ester is ethyl acetate.

11. The method as claimed in claim 1, wherein the organic acid ester is methyl acrylate.

12. The method as claimed in claim 2, wherein the organic acid ester is ethyl benzoate.

13. The method as claimed in claim 3, wherein the nitro compound is nitrobenzene.

14. The method as claimed in claim 3, wherein the nitro compound is nitromethane.

15. The method as claimed in claim 1, wherein the phosphorylating agent is pyrophosphoryl tetrachloride.

16. The method as claimed in claim 1, wherein the phosphorylating agent is phosphorus oxychloride.

17. The method as claimed in claim 1, wherein the molar ratio of phosphorylating agent to ribonucleoside is about 2 to about 15 and the molar ratio of organic acid ester and nitro compound respectively to ribonucleoside is about 40 to about 600.

References Cited

UNITED STATES PATENTS

| | | | |
|---|---|---|---|
| 3,171,833 | 3/1965 | Sorm et al. | 260—211.5 |
| 3,201,389 | 8/1965 | Fusimoto et al. | 260—211.5 |
| 3,282,920 | 11/1966 | Ouchi et al. | 260—211.5 |
| 3,288,780 | 11/1966 | Tsuchiya et al. | 260—211.5 |
| 3,290,285 | 12/1966 | Senoo et al. | 260—211.5 |

LEWIS GOTTS, *Primary Examiner.*

JOHNNIE R. BROWN, *Examiner.*